Dec. 16, 1969          C. R. VENABLE, JR., ET AL          3,484,212
       REFRACTORY LINED APPARATUS HAVING A REMOVABLE
                    SEALED CLOSURE ASSEMBLY
                    Filed Sept. 6, 1966

INVENTOR
C. R. VENABLE, JR.
Z. E. WOOD
V. A. CAWI

BY

ATTORNEYS

United States Patent Office 3,484,212
Patented Dec. 16, 1969

3,484,212
REFRACTORY LINED APPARATUS HAVING A REMOVABLE SEALED CLOSURE ASSEMBLY
Charles R. Venable, Jr., Zollie E. Wood, and Vernon A. Cawi, Bartlesville, Okla., assignors to Phillips Petroleum Company, a corporation of Delaware
Filed Sept. 6, 1966, Ser. No. 577,453
Int. Cl. B01d 3/00; C10g 7/00, 9/08
U.S. Cl. 23—284                                          6 Claims

ABSTRACT OF THE DISCLOSURE

A refractory lined vessel which has a removable sealed closure assembly which allows access to the inlet and mixing conduits of the apparatus. The sealed closure assembly can be easily removed without injury to the refractory lining of the vessel and the sealing arrangement prevents reactant gases from bypassing the refractory lining thus overheating the shell of the apparatus.

---

Figure 1:
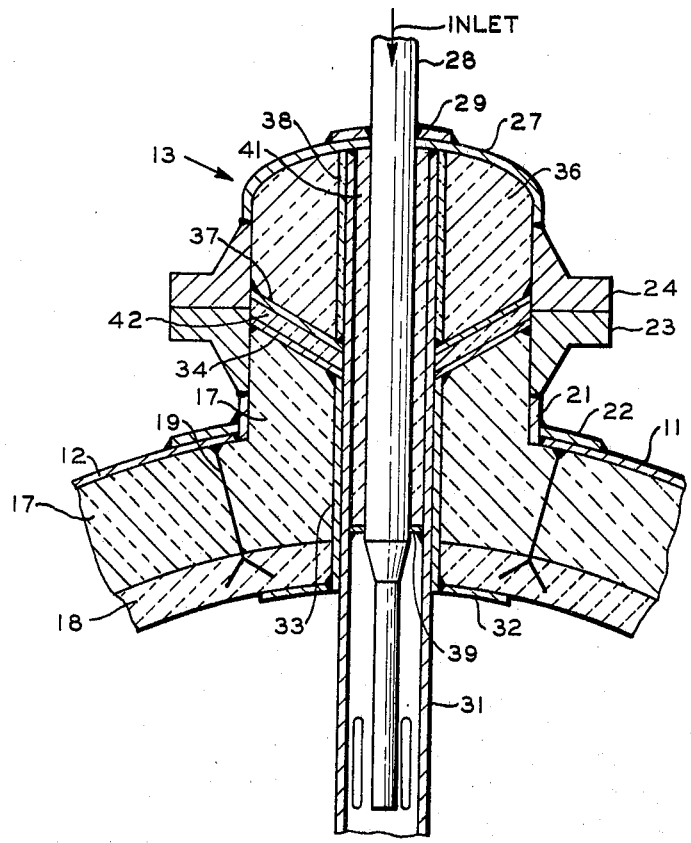
Figure 1:
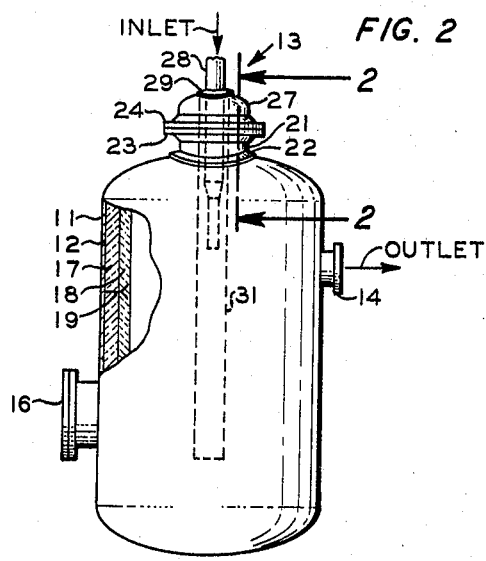

This invention relates to refractory lined apparatus. In one aspect it relates to a refractory lined vessel having a removable conduit. In another aspect it relates to a removable feed inlet assembly.

It is necessary at times to remove conduit connections from refractory lined vessels. For example, the advantage of recirculation of reactant gases in processes such as hydrodealkylation is well known. Such a process has been carried out employing a reactor comprising a metal shell having refractory lining within and adjacent the shell and an internal feed inlet conduit having a nozzle therein. Deposits of materials such as coke on the feed inlet conduit, maintenance of the feed inlet conduit, and inspection of the reactor require disassembly of the reactor and heretofore damage to the refractory lining of the reactor as well as damage to the feed inlet conduit often resulted.

An object of the invention is to provide a refractory lined vessel.

Another object of the invention is to provide for removal of a feed inlet conduit from a refractory lined vessel without damage to the refractory lining.

Another object of the invention is to provide a removable feed inlet mixing conduit for a reactant feed inlet assembly.

Another object of the invention is to prevent high temperature reactant gases from by-passing a refractory lining of a reactor and thereby to prevent overheating the shell of the reactor.

Another object of the invention is to confine the high temperature shell area of a reactor to minimize the use of stainless or high alloy steel in the reactor, thus reducing the cost of the reactor.

Other aspects, objects and advantages of the invention will be apparent to one skilled in the art from a study of the written description, drawings and the claims.

According to the invention there is provided a refractory lined vessel having an inlet and an outlet therein which comprises an outer shell, a first conduit, and a second conduit. One end of the first conduit is attached to the outer shell of the vessel so that the conduit is in fluid communication with the vessel. The outwardly extending end of the conduit has a facing surface which complements the facing surface on one end of the second conduit thereby defining a sealing space between the first and second conduits into which refractory cement material is placed.

A first insulation retainer element is positioned within the first conduit. One end of the first insulation retainer is adjacent the insulation within the vessel and the other end is attached to the first conduit. The annulus formed between the first conduit and the first insulation retainer element is filled with a first refractory liner.

The second conduit has an enclosure member which is attached to its outer end, the second conduit and enclosure member thus forming a closure means. The enclosure member has an opening therein which communicates with a third conduit which is attached to the enclosure member. The annulus formed between the third conduit and the second conduit is filled with a second refractory liner. A second insulation retainer element which defines the complementing facing surface of the second conduit is attached to the second conduit and the third conduit and further serves to maintain the second refractory material in place.

A second insulation retainer element is attached to the second conduit and the third conduit for maintaining the second refractory liner in place and complements the first insulation retainer element in defining a sealing space therebetween. A refractory cement is then placed in the sealing space to seal the first and second conduits together. Upon separating the first and second conduits to inspect the third conduit on the vessel itself only the refractory cement in the sealing space is disturbed with no damage to the conduits, the refractory liners, or the vessel.

Further according to the invention, a third insulation retainer element is positioned between the third conduit and an inlet conduit positioned within the third conduit to prevent high temperature reactant gases from bypassing the first and second refractory liners in the first and second conduits.

In the drawing FIGURE 1 is an elevation, partly in cross section, of a refractory lined reactor.

FIGURE 2 is a cross section of the reactant feed inlet assembly of the reactor of FIGURE 1.

In FIGURE 1 a reactor vessel, generally designated by numeral 11, comprises a metal shell 12 having a feed inlet assembly 13 centrally positioned adjacent one end of reactor vessel 11, an effluent outlet 14 provided near the inlet end of reactor vessel 11 as shown, and a manhole 16 positioned in a portion of reactor vessel 11 removed from inlet assembly 13 for access to and maintenance of reactor vessel 11. Shell 12 is provided with protective and insulating linings 17 and 18 which are positioned against the inner surface of shell 12 by a multiplicity of insulation anchors 19.

Reactor feed inlet assembly 13 is illustrated in more detail in FIGURE 2, although the illustration is also schematic and simplified.

Reactor feed inlet assembly 13 comprises a short cylindrical pipe 21 attached to shell 12 by a welded flange 22. At the outer end of cylindrical pipe 21, one-half 23 of a pair of mating flanges 24 and 23 is welded to the top of cylindrical member 21. The removable portion of the reactor feed inlet assembly comprises the outer half 24 of the pair of mating flanges 24 and 23 to which is welded closure member 27. The mating flange 24 is referred to in this sepecification as the second conduit and in combination with closure member 27 provides a closure means removably attached to the conduit formed by members 22, 23, and 24. Feed inlet conduit 28 is attached to flange 29 by welding, and flange 29 is attached to closure member 27 by welding. Mixing conduit 31 also is welded to closure member 27 and extends into vessel 11 surrounding feed inlet conduit 28. Referring to FIGURE 2, vessel 11 is lined with insulation 17 and 18 which are retained adjacent the inner wall of the vessel opening by means of an insulation retainer comprising an inner retainer member 32, a cylindrical member 33, and an outer retainer member 34. Similarly, insulation 36 is retained in the space formed by outer flange member 24 and closure member 27 by an insulation retainer 37 and by mixing conduit 31. Between mixing conduit 31 and insulation 36 is a wrapping of insulation 38. Also insulation retaining ring or high temperature sealing ring 39, such as a weld seal ring, is positioned within mixing conduit 31 and around feed inlet conduit 28 to hold insulation 41 in place. When the movable portion of the reactor feed inlet assembly is placed in the reactor, the space between outer retainer member 34 and the insulation retainer 37 is filled with insulation material 42 which can readily be parted to permit removal of the removable portion of the apparatus. Therefore, when, after a period of operation, it is necessary to remove the feed inlet conduit, when the mating flanges 23 and 24 are separated, the insulation parts in the space between outer retainer member 34 and the insulation retainer 37 without damage to the main body of the insulation of the reactor or feed inlet conduit 28.

It is noted that retainer 32, retainer 34, and cylindrical member 33 are welded in place in the reactor as shown in FIGURE 2, while retainer 37 is welded to mixing tube 31 and to flange half 24.

Such problems as damage to the refractory lining of the vessel or damage to the feed inlet conduit are overcome by the present invention which has the advantage of a removable mixing conduit which allows the feed inlet conduit to be inspected without damage to the main body of the refractory lining of the reactor. Coke deposits upon feed inlet conduit 28 can be removed and feed inlet conduit 28 repaired without damage to the feed inlet conduit or the reactor. Upon removal of the mixing conduit 31 in the present invention only refractory cement 42 between complementing members of a flanged header and a flanged inlet must be replaced. Thus, the use of an insulating refractory lagging material in the area between the complementing members of the flanged header and the flanged inlet facilitates replacement of the assembly with a minimum of effort and maximum protection against "hot spots" on the shell.

Another advantage of the present invention is that when the reactor and reactor feed inlet assembly are assembled and operating, the area of "high temperature shell" is confined by a sealing ring 39. Ring 39 is attached to the inner periphery of mixing conduit 31, and sized to fit closely around conduit 28. The sealing ring confines the area of "high temperature shell" and eliminates the overheating of the shell by high temperature reactant gases by-passing the refractory lining, thus reducing the amount of stainless or high alloy steel needed in the reactor.

It will be apparent to those skilled in the art that the illustrations are schematic and details of means for assembling and disassembling the equipment, and specific items of equipment necessary or desirable in the operation of a reactor, including for example, valves, pumps, control means, etc., have been omitted, thus clarifying the illustration of the invention. Although the invention has been described in connection with and has particular utility in the operation of a reactor, the apparatus claimed can also be used in connection with vessels used for other purposes.

Reasonable variations and modifications are possible within the scope of this invention which sets forth improved refractory lined apparatus and a removable conduit assembly therefor.

We claim:
1. A refractory lined vessel comprising:
 (a) an outer shell having an inlet and an outlet therein;
 (b) a first conduit affixed to said shell and communicating with the interior of said shell through said inlet;
 (c) a first insulation retainer element positioned within said first conduit and forming an annulus therein, said first insulation retainer being adjacent insulation within said vessel at one end and attached to said first conduit at its other end;
 (d) a first refractory liner disposed within the annulus formed by said first insulation retainer element and said first conduit;
 (e) closure means removably attached to the end of said first conduit, said closure means having an opening therein;
 (f) a second refractory liner disposed within said closure means and defining a passageway with said first insulation retainer element into said vessel;
 (g) a mixing conduit affixed to said closure means, and extending through the passageway defined by said first insulation retainer element and said second refractory liner a substantial distance into the interior of the vessel; and
 (h) a second insulation retainer element attached to said mixing conduit and to said closure means, said second insulation retainer element and first insulation retainer element defining a sealing space therebetween so refractory cement can be placed in said sealing space.

2. Apparatus according to claim 1 wherein said first and second insulation retainers have frusto-conical portions which define the sealing space therebetween, the apexes formed by said first and second insulation retainers are in the direction of the said vessel.

3. Apparatus according to claim 1 wherein within said mixing conduit is an inlet conduit extending through and affixed to the opening in said closure means, and extending through the passageway formed by said mixing conduit so that the mixing conduit surrounds the inlet conduit, the inlet conduit extending into the mixing conduit for a distance which is less than the distance that the mixing conduit extends into the vessel, said inlet conduit positioned within said mixing conduit thereby forming an annulus within said mixing conduit.

4. Apparatus according to claim 3 wherein a third insulation retainer element is positioned within the annulus formed by said mixing conduit and said inlet conduit, said third retainer comprising a weld seal ring affixed to said mixing conduit and said inlet conduit thereby causing the annulus formed therebetween to be closed off from the vessel.

5. Apparatus according to claim 1 wherein the closure means comprises a conduit having an outwardly extending flange one end which forms one of a pair of mating flanges and a closure member which is welded to the other end of the conduit.

6. Apparatus according to claim 5 wherein the other of said pair of mating flanges is provided by the end of said first conduit and extends outwardly to form the mating flange.

References Cited
UNITED STATES PATENTS
2,996,361    8/1961    Brumbaugh _____ 23—288
3,008,811    11/1961    Brumbaugh et al. _____ 23—289

JAMES H. TAYMAN, Jr., Primary Examiner

U.S. Cl. X.R.

23—289; 196—133, 135; 208—48; 431—154; 239—132.3, 132.5; 285—363